(No Model.)
R. V. BOICE.
HARVESTER.
No. 299,106. Patented May 27, 1884.
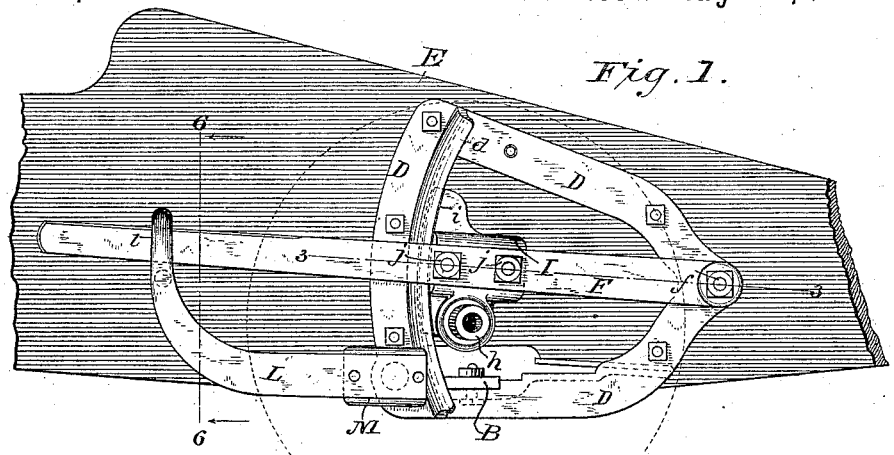
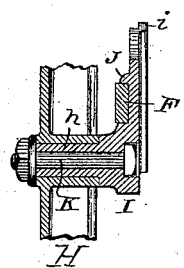
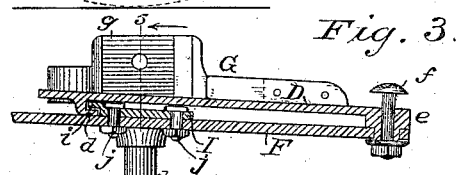
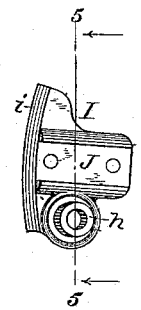
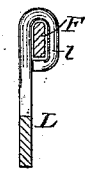
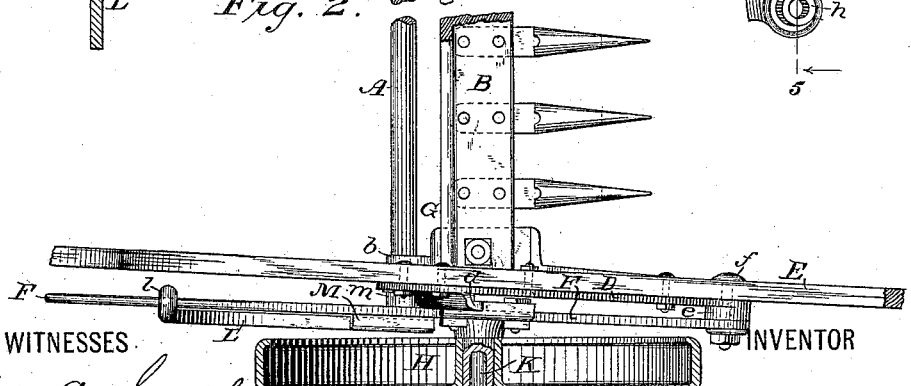
WITNESSES
Wm A. Skinkle
Alfred C. Newman
INVENTOR
Reed V. Boice
By his Attorneys
Baldwin Hopkins & Peyton

UNITED STATES PATENT OFFICE.

REED V. BOICE, OF TOLEDO, OHIO.

HARVESTER.

SPECIFICATION forming part of Letters Patent No. 299,106, dated May 27, 1884.

Application filed October 23, 1883. (No model.)

*To all whom it may concern:*

Be it known that I, REED V. BOICE, of Toledo, in the county of Lucas and State of Ohio, have invented certain new and useful Improvements in Harvesters, of which the following is a specification.

My invention relates to improvements applicable to one-wheeled harvesters of the class in which the finger-beams and grain-platforms are simultaneously adjustable at their outer and inner ends. A machine of this class is shown in United States Letters Patent No. 271,430, granted to the assignees of John S. Davis, January 30, 1883. My object mainly is to lessen—practically prevent—the backward and forward movements of the grain-wheel during the vertical adjustments of the cutting apparatus and platform of a machine such as shown in the patent referred to.

In the accompanying drawings only those parts are shown illustration of which is required to represent a suitable application of my improvements.

Figure 1 is an end view, the grain-board being partly broken away and the grain-wheel dotted in place. Fig. 2 is a plan view, with the grain-platform omitted, parts broken away, and the grain-wheel in section. Fig. 3 is a view partly in plan and partly in section on the line 3 3 of Fig. 1, showing details of some of the devices for supporting the grain-wheel and adjusting the platform and finger-beam. Fig. 4 shows in elevation a bracket provided with a journal for the grain-wheel. Fig. 5 is a view in section on the lines 5 5 of Figs. 3 and 4, with the grain-wheel partly shown. Fig. 6 is a view in section on the line 6 6 of Fig. 1, showing the connection between a lever to which the journal-bracket is secured and an arm which is secured to the outer end of a cranked rod supported in rear of the finger-beam.

A cranked rod, A, is supported in rear of the finger-beam B and beneath the platform (not shown) by being journaled in suitable lug-bearings, two of which $b$ $b$, are shown, and the crank $a$ is connected with the main frame of the machine, so as to be maintained practically at an unvarying altitude relatively to the frame at all times, as described in the before-mentioned patent. A chain is connected at one end with the inner lug-bearing $b$ and at its opposite end with suitable raising and lowering devices, and a heel-post, C, has vertically-adjustable connection with the main frame by means of a guiding and supporting sleeve, all in accordance with the invention set forth in said Patent No. 271,430. A centrally-open casting or skeleton bracket, D, firmly but detachably fixed to the finger-beam and the grain-board E, is provided with a circularly-curved segmental guideway, $d$, at its rear, and a tubular boss, $e$, at its front end, with which the guideway is concentric. A lever, F, with which the grain-wheel is connected, as further on to be explained, is pivoted at its front end about the round reduced end of the bracket-boss, being secured in place by a bolt, $f$, and its nut and washer. The guideway-bracket D, as shown, constitutes the outer shoe, and the inwardly-projecting base-flange G of this bracket is recessed to form a seat or socket, $g$, in which the finger-beam fits. A bolt and nut, in connection with the flange-seat, strongly unite the bracket and finger-beam. One of the bearings $b$ in which the cranked rod A is mounted is formed with the bracket D. The lever F carries the grain-wheel H, with which it is connected, in rear of the pivoting-boss $e$, by means of a bracket, I, secured to the lever and having a tubular journal, $h$, upon which the grain-wheel is mounted. This journal-bracket serves to make vertically-sliding connection between the lever and the guideway $d$ of the bracket D. As shown, a guideway-lip, $i$, on the journal-bracket engages with the guideway $d$, and the journal-bracket is strongly secured to the lever by means of a seat or socket, J, in the bracket, in which the lever fits, and bolts $j$ $j$ and their nuts. The grain-wheel is secured at its hub about its journal by means of a bolt, K, and its nut and washer, as clearly shown in the drawings. Near its rear end the grain-wheel lever has adjustable connection with the rod A by means of an arm, L, rigidly but detachably connected with the outer end of the rod and projecting backwardly therefrom. As shown, the arm L curves upwardly, and terminates at its rear end in a loop or eye, $l$, through which the lever passes loosely, so as to have endwise movement therein, and at its front end the arm is rigidly united to a sleeved clip or socket-iron, M, by means of a seat in the clip in which the lever is fitted, and bolts or rivets. The sleeve m of the clip is fitted about the outer end of the cranked rod A and detachably secured thereto in suitable way, as by a cross pin or key.

From the above description, aided, if necessary, by reference to the above-mentioned Patent No. 271,430, it will be seen that in raising and lowering the finger-beam simultaneously at both ends the grain-wheel is maintained throughout the adjustments in, practically considered, the same vertical plane as that in which the longitudinal axis of the finger-beam is located. It will be understood that slight endwise movement is imparted to the grain-wheel lever relatively to the arm of the cranked rod, and that consequently the lever slides in the loop of said arm. Besides the obvious advantages resulting from locating the grain-wheel journal in the vertical plane of the finger-beam's length, and rendering unnecessary any noticeable backward or forward movement of the wheel in vertically adjusting the finger-beam, there are the additional advantages of bracing the grain-board and very strongly connecting it with the finger-beam, and of having the grain-wheel pulled, instead of pushed, forward over the ground, arising from the employment of the guideway-bracket, and the grain-wheel lever pivoted at its front end thereto, in accordance with my invention.

I claim as of my own invention—

1. The combination, substantially as hereinbefore set forth, of the finger-beam, the grain-board, the guideway-bracket secured to the finger-beam and grain-board, the grain-wheel lever pivoted at its front end to the guideway-bracket, and having vertically-adjustable connection with said bracket, and the grain-wheel, for the purpose described.

2. The combination, substantially as hereinbefore set forth, of the finger-beam, the cranked rod, the grain-board, the guideway-bracket, the grain-wheel lever pivoted at its front end, and having vertically-adjustable connection with said bracket, and the arm at the outer end of the cranked rod, with which the lever has sliding connection, for the purpose described.

3. The combination, substantially as hereinbefore set forth, of the finger-beam, the cranked rod, the grain-board, the guideway-bracket, the grain-wheel lever pivoted at its front end, the journal-bracket secured to said lever, and having sliding engagement with the guideway-bracket, the grain-wheel, and the arm of the cranked rod, with which the grain-wheel lever has sliding connection, for the purpose described.

4. The bracket D, adapted to be secured to the grain-board, having the cranked-rod bearing, and the socket g for attachment to the finger-beam, and provided with the boss at its front end and the guideway at its rear end, substantially as and for the purpose hereinbefore set forth.

5. The combination of the grain-wheel lever, the journal-bracket secured thereto, the bracket to which the lever is pivoted, and having the guideway with which the journal-bracket has sliding engagement, and the cranked-rod arm with which the grain-wheel lever has sliding connection, substantially as and for the purpose hereinbefore set forth.

6. The combination of the finger-beam, the cranked rod, the arm at the outer end thereof, the grain-board, the grain-wheel lever pivotally supported at its front end, and having adjustable connection at its rear end with the arm of the cranked rod, and the grain-wheel, substantially as and for the purpose hereinbefore set forth.

In testimony whereof I have hereunto subscribed my name this 19th day of October, A. D. 1883.

REED V. BOICE.

Witnesses:
CHAS. EATON,
JOHN F. WERNERT.